(12) United States Patent
Nilsen

(10) Patent No.: US 10,982,804 B1
(45) Date of Patent: Apr. 20, 2021

(54) PIVOT CLAMP SYSTEM AND METHOD OF USE

(71) Applicant: Stian Nilsen, New York, NY (US)

(72) Inventor: Stian Nilsen, New York, NY (US)

( * ) Notice: Subject to any disclaimer, the term of this patent is extended or adjusted under 35 U.S.C. 154(b) by 0 days.

(21) Appl. No.: 16/294,407

(22) Filed: Mar. 6, 2019

(51) Int. Cl.
*F16M 11/00* (2006.01)
*F16M 11/04* (2006.01)
*F16B 2/18* (2006.01)
*F16B 2/04* (2006.01)

(52) U.S. Cl.
CPC .............. *F16M 11/04* (2013.01); *F16B 2/04* (2013.01); *F16B 2/185* (2013.01)

(58) Field of Classification Search
CPC . F16M 11/04; F16B 2/04; F16B 2/185; B25B 7/02; B25B 7/12; B25B 27/146
USPC ................. 248/122.1; 81/371, 319
See application file for complete search history.

(56) References Cited

U.S. PATENT DOCUMENTS

| 6,116,124 | A | * | 9/2000 | Ping | B25B 7/12 81/319 |
|---|---|---|---|---|---|
| 2009/0223331 | A1 | * | 9/2009 | Jordan | B25B 7/02 81/371 |
| 2013/0249154 | A1 | * | 9/2013 | Li | B25B 25/00 269/6 |
| 2017/0373453 | A1 | * | 12/2017 | Liao | B25B 27/14 |

* cited by examiner

*Primary Examiner* — Todd M Epps
(74) *Attorney, Agent, or Firm* — Richard Eldredge; Eldredge Law Firm

(57) ABSTRACT

A pivot clamp system allows for boards, reflective material or similar objects to be held in place and easily repositioned to move the object to the desired orientation. The system uses a holding plate with a pin that passes through the object and is secured by a locking device.

3 Claims, 5 Drawing Sheets

PIVOT CLAMP SYSTEM AND METHOD OF USE

BACKGROUND

1. Field of the Invention

The present invention relates generally to clamp systems, and more specifically, to a pivot clamp system for holding thin planer objects in a manner that is easily adjustable.

2. Description of Related Art

Clamp systems are well known in the art and are effective means to grip and hold objects stationary. For example, FIG. 1 depicts a conventional plate clamp device 101 having a set of plates 103 joined by a hinge 109 and activated by a set of handles 105. The handles 105 lock in position so that the set of plates holds an item therebetween. A rod 107 is attached to the handles to allow the device 101 to be placed in stands or holders to position the device 101 and what it holds. Commonly this device 101 is used to hold lightweight boards to create the proper light for photography. The device 101 is used in any instance where a large planer object needs to be held in an erect position.

One of the problems commonly associated with device 101 is its limited efficiency. For example, obtaining the desired position is cumbersome as the object being held is not easily adjusted with respect to the set of plates 103.

Accordingly, although great strides have been made in the area of plate clamp devices, many shortcomings remain.

DESCRIPTION OF THE DRAWINGS

The novel features believed characteristic of the embodiments of the present application are set forth in the appended claims. However, the embodiments themselves, as well as a preferred mode of use, and further objectives and advantages thereof, will best be understood by reference to the following detailed description when read in conjunction with the accompanying drawings, wherein:

Figure 1:
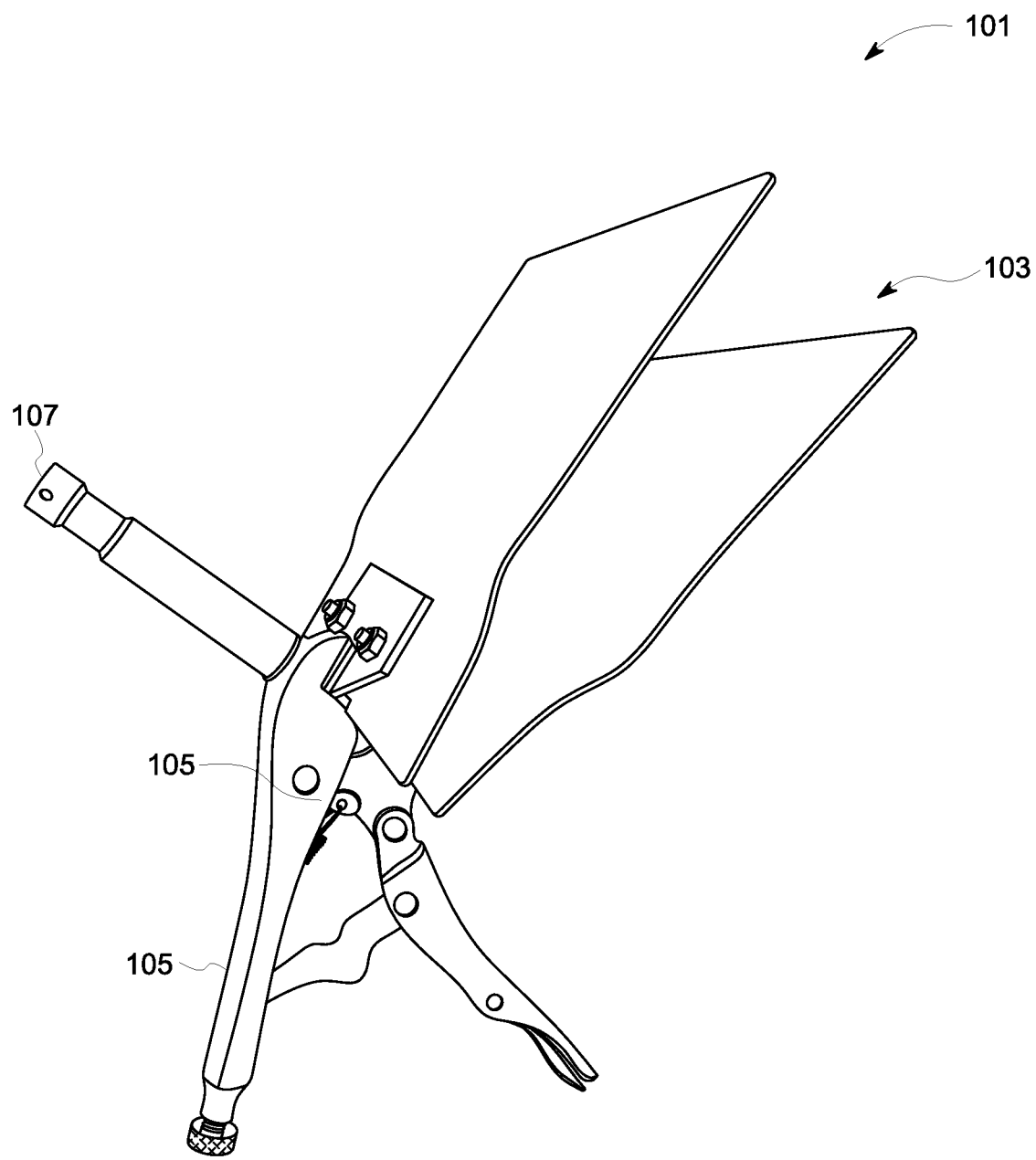
FIG. 1 is a side view of a common plate clamp device.

While the system and method of use of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the present application as defined by the appended claims.

DETAILED DESCRIPTION OF THE PREFERRED EMBODIMENT

Illustrative embodiments of the system and method of use of the present application are provided below. It will of course be appreciated that in the development of any actual embodiment, numerous implementation-specific decisions will be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The system and method of use in accordance with the present application overcomes one or more of the above-discussed problems commonly associated with conventional plate clamp devices. Specifically, the invention of the present application allows for small and precise adjustments to the position of the object being held. This and other unique features of the system and method of use are discussed below and illustrated in the accompanying drawings.

The system and method of use will be understood, both as to its structure and operation, from the accompanying drawings, taken in conjunction with the accompanying description. Several embodiments of the system are presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless described otherwise.

The preferred embodiment herein described is not intended to be exhaustive or to limit the invention to the precise form disclosed. It is chosen and described to explain the principles of the invention and its application and practical use to enable others skilled in the art to follow its teachings.

Figure 2:
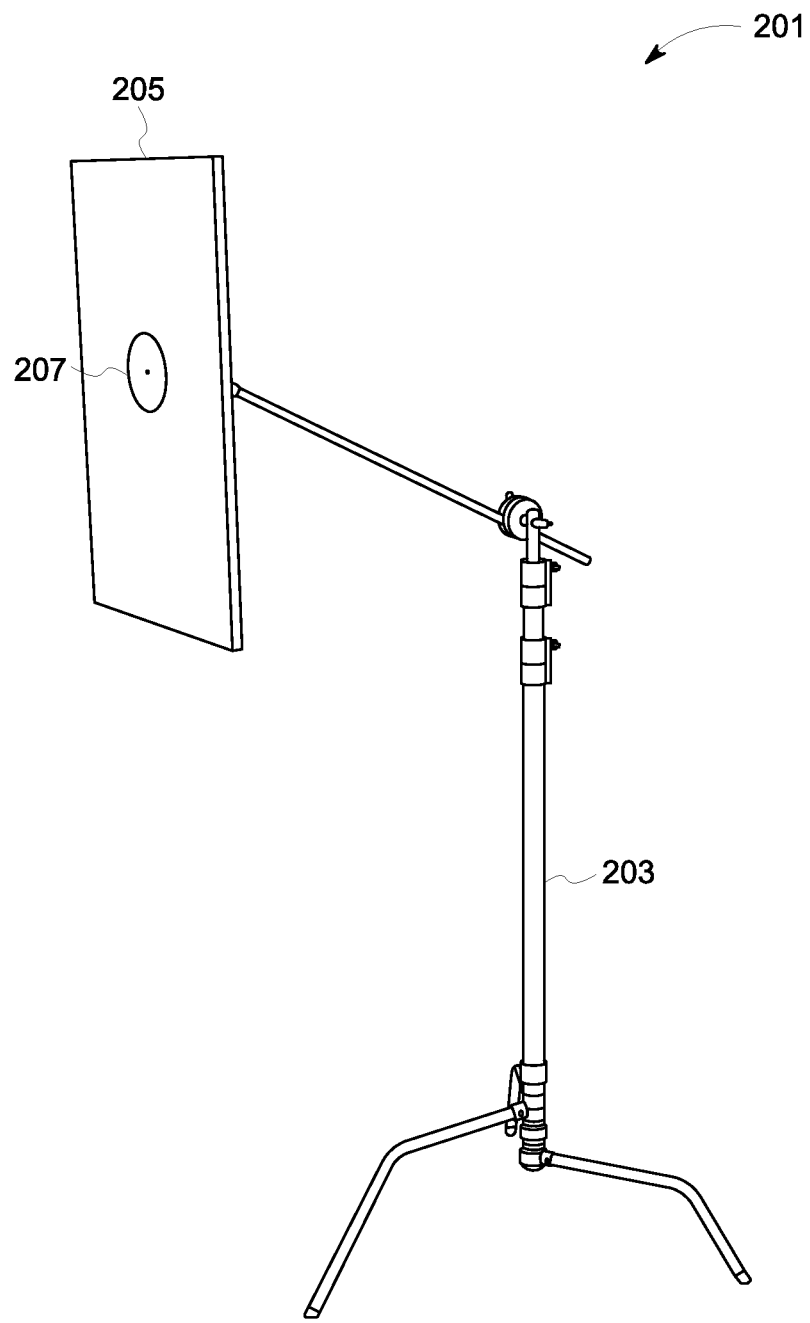
FIG. 2 is a perspective view of a pivot clamp system in accordance with a preferred embodiment of the present application.

Referring now to the drawings wherein like reference characters identify corresponding or similar elements throughout the several views, FIG. 2 depicts a perspective view of a pivot clamp system in accordance with a preferred embodiment of the present application. It will be appreciated that system 201 overcomes one or more of the above-listed problems commonly associated with conventional plate clamp devices.

In the contemplated embodiment, system 201 includes stand 203 removably attached to a pivot clamp device 207. The pivot clamp device 207 holds a board 205 therein. In use, the stand 203 is adjusted to place the board 205 in a desired position that is beneficial to a user.

Figure 3:
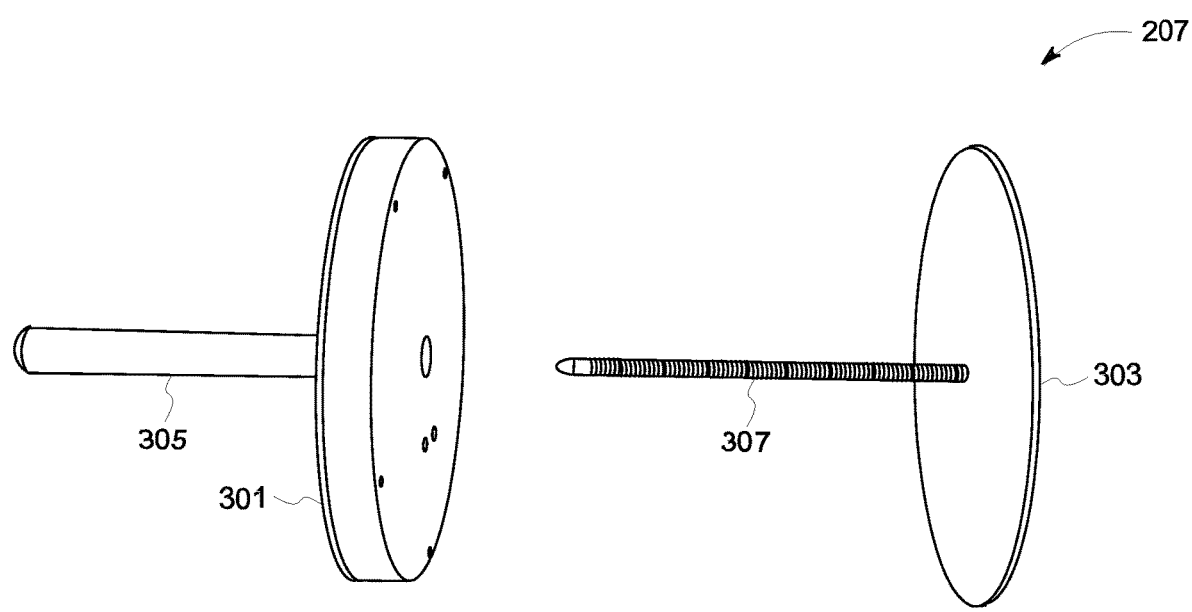
FIG. 3 is a side view of the pivot clamp device of FIG. 2.

Referring now to FIG. 3 the plate clamp device 207 is depicted. The pivot clamp device includes an attachment shaft 305 configured to join the pivot clamp device 207 to the stand 203 and a locking device 301 rigidly attached to the attachment shaft 305. The locking device 301 is configured to receive and hold in place a pin 307 this is rigidly attached near the center of a holding plate 303. In the current embodiment, it is contemplated that in use the pin 307 passes through the board 205 and engages with the locking device 301 to hold the board 205 therebetween.

It should be appreciated that one of the unique features believed characteristic of the present application is that the board 205 is easily and precisely adjustable with respect to the pivot clamp device 207. It will also be appreciated that the pivot clamp device could be manufactured to be small enough to be portable while still providing the force to hold the needed boards.

Figure 4:
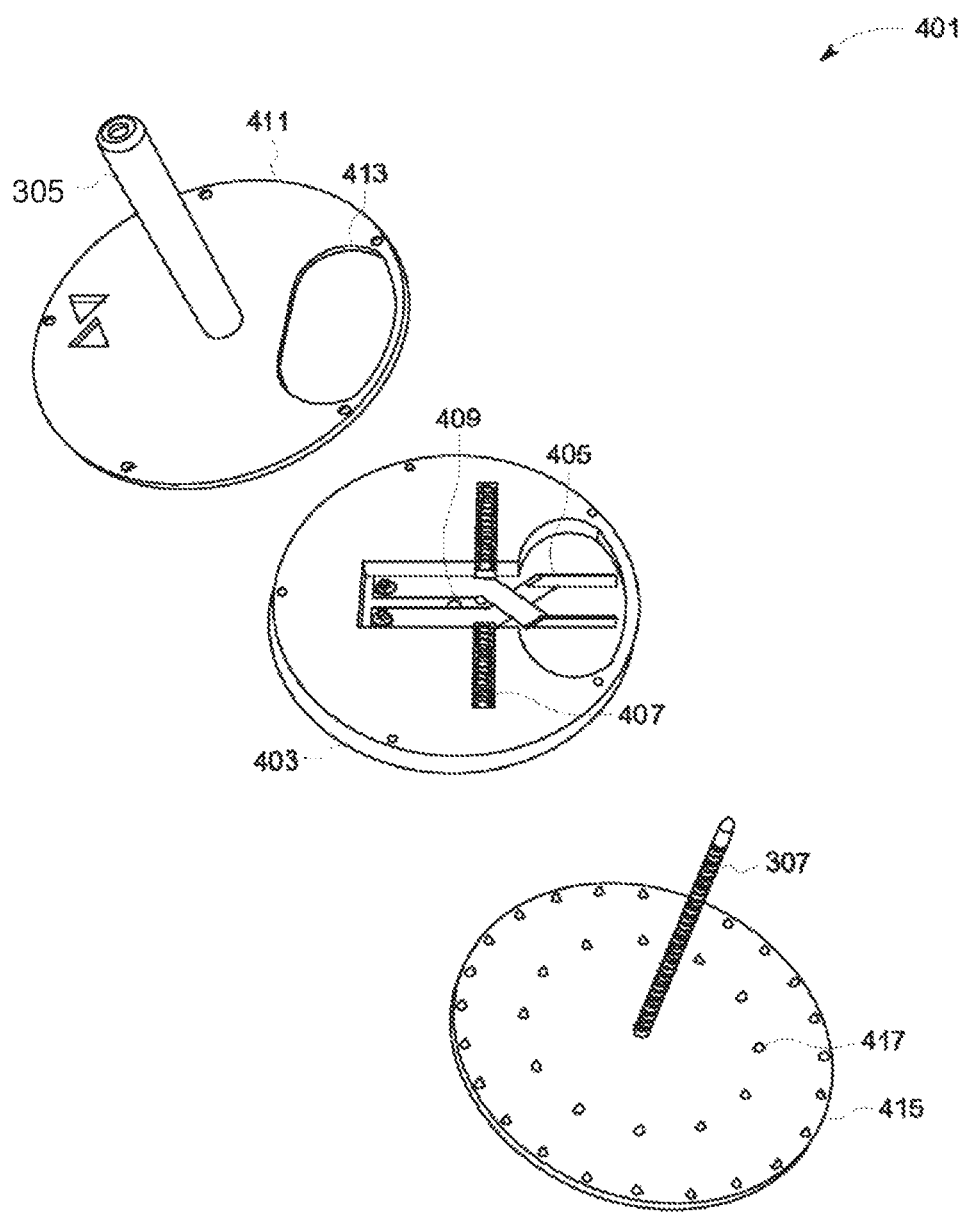
FIG. 4 is an exploded view of an alternative embodiment of the pivot clamp device of FIG. 2.

Referring now to FIG. 4 an alternative embodiment of the pivot clamp device 207 is depicted. Embodiment 401 includes similar features as pivot clamp device 207 wherein the holding plate 415 includes multiple points 417 that are contemplated to provided grip to the board 205.

The locking device 403 includes release handles 405 positioned over an opening 409 and maintained in the locked position by a set of springs 407. The locking device 403 is attached to a backing plate 411 with an access port 413 positioned over the release handles 405 so that they are operable. While the current locking device 401 is depicted and described any method of securing the holding plate 415 to the backing plate 411 is contemplated.

Figure 5:
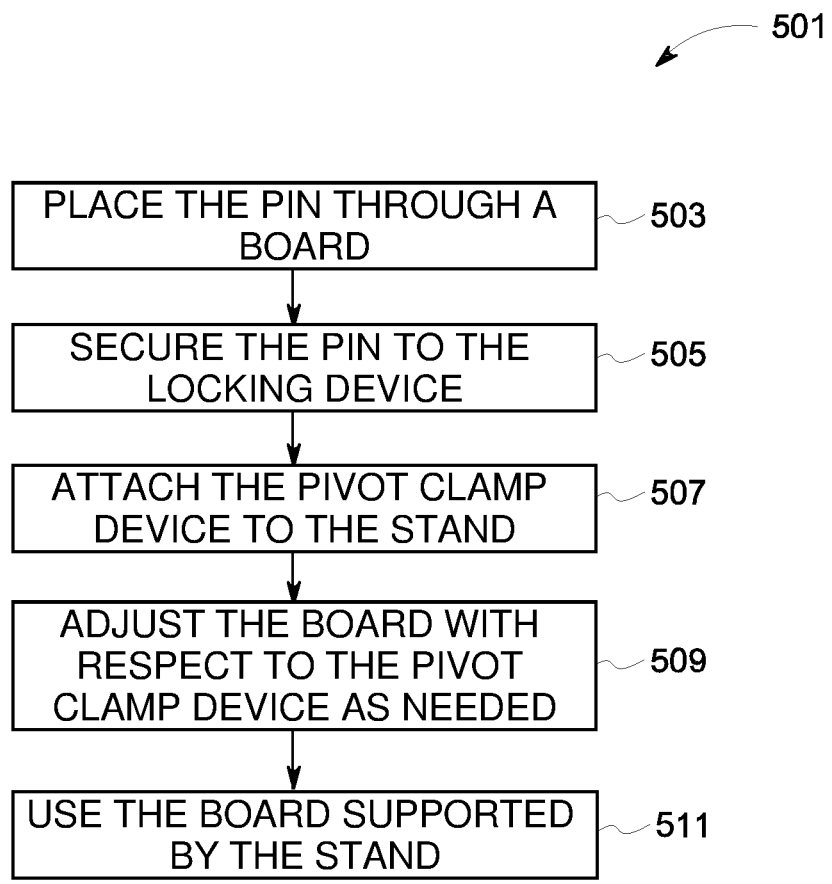
FIG. 5 is a flowchart of the preferred method of use of the system of FIG. 2.

Referring now to FIG. 5 the preferred method of use of system 201 is depicted. method 501 includes placing the pin through a board 503, securing the pin to the locking device 505, attaching the pivot clamp device to the stand 507, adjusting the board with respect to the pivot clamp as needed 509, and using the board 511.

The particular embodiments disclosed above are illustrative only, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. Although the present embodiments are shown above, they are not limited to just these embodiments, but are amenable to various changes and modifications without departing from the spirit thereof.

What is claimed:

1. A pivot clamp system comprising:
   a stand; and
   a pivot clamp device secured to the stand, the pivot clamp device having:
   a holding plate;
   a pin integral with and extending from a surface of the holding plate;
   a backing plate having a protrusion integral with and extending from an outer surface of the backing plate, the protrusion is configured to engage with and removably secure with the pin, the backing plate forming an opening; and
   a locking device disposed between holding plate and the backing plate, the locking device having a handle configured to releasably engage with the pin;
   wherein the holding plate and locking device are configured to secure a planer object therebetween.

2. The system of claim 1 wherein the holding plate includes a plurality of points.

3. A method of holding a planer object given the system of claim 1, comprising:
   placing the pin through a board;
   securing the pin to the locking device;
   attaching the pivot clamp device to a stand;
   adjusting the board with respect to the pivot clamp as needed; and
   using the board.

* * * * *